United States Patent [19]

Bartman et al.

[11] Patent Number: 4,891,053
[45] Date of Patent: Jan. 2, 1990

[54] METHOD OF MANUFACTURING BICONVEX LENS ELEMENTS AND ELEMENT FORMED THEREBY

[75] Inventors: Gerrit E. Bartman; Nicodemus Hattu; Willem J. Lindhout; Sebastiaan F. M. Trommelen, all of Eindhoven, Netherlands

[73] Assignee: U.S. Philips Corp., New York, N.Y.

[21] Appl. No.: 263,661

[22] Filed: Oct. 27, 1988

[30] Foreign Application Priority Data

Nov. 10, 1987 [NL] Netherlands ............... 8702679

[51] Int. Cl.⁴ ............................................ C03B 23/00
[52] U.S. Cl. ............................................ 65/64; 65/39;
264/1.2; 264/2.2; 350/409; 350/417; 425/808
[58] Field of Search ........... 425/808; 264/1.2, 2.2, 264/2.4, 2.5; 65/37, 39, 59.4, 64; 350/417, 409, 422

[56] References Cited

U.S. PATENT DOCUMENTS

| | | | |
|---|---|---|---|
| 3,660,545 | 5/1972 | Wichterle | 264/2.5 X |
| 4,121,896 | 10/1978 | Shepherd | 425/808 X |
| 4,208,364 | 6/1980 | Shepherd | 264/2.2 |
| 4,390,482 | 6/1983 | Feurer | 425/808 X |
| 4,391,622 | 7/1983 | Alting et al. | 65/66 |
| 4,398,935 | 8/1983 | Smulders et al. | 65/64 |
| 4,407,766 | 10/1983 | Haardt et al. | 425/808 X |
| 4,591,373 | 5/1986 | Sato | 65/29 |
| 4,698,089 | 10/1987 | Matsuzaka | 65/290 |
| 4,726,829 | 2/1988 | Gac et al. | 65/61 X |

*Primary Examiner*—Robert L. Lindsay
*Attorney, Agent, or Firm*—William L. Botjer

[57] ABSTRACT

A method of manufacturing biconvex lens elements (21) comprising a biconvex glass lens (23) and a holder (1) consisting of two cylindrical rings (5,7), which are telescopically slidable with respect to each other and have different diameters so that an annular gap (9) is formed. A lens blank is heated together with the holder (1) in the telescopically extended position of the rings (5,7) to the processing temperature of the glass and is arranged between the heated dies (17, 19) of a mould, whereupon the dies (17, 19) are moved towards each other in a pressing stroke, the two rings (5,7) being telescoped into each other, the lens blank in the holder being moulded into a biconvex glass lens (23) and the excess quantity of glass being pressed from the hotter central part of the lens blank into the annular gap (9). The lens element (21) obtained after cooling is characterized by a biconvex glass lens (23), which is FIG. 7.

9 Claims, 2 Drawing Sheets

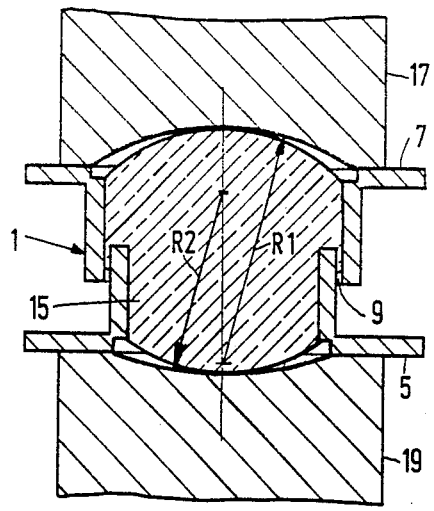
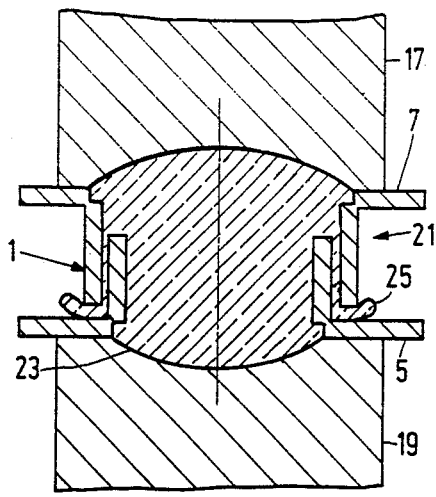
FIG.5  FIG.6
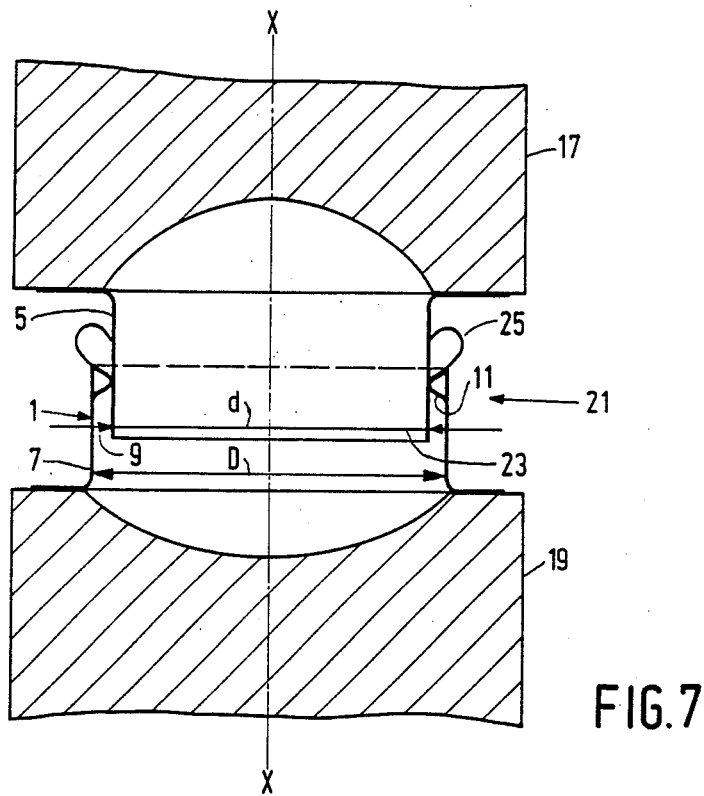
FIG.7

METHOD OF MANUFACTURING BICONVEX LENS ELEMENTS AND ELEMENT FORMED THEREBY

BACKGROUND OF THE INVENTION

The invention relates to a method of manufacturing biconvex lens elements comprising a biconvex glass lens and a metal holder, in which a lens blank having an overdimensioned glass volume is heated together with a metal holder to the processing temperature of the glass, the holder with the lens blank is arranged between the heated dies of a mould, which dies have at their mould surfaces a concave profile corresponding to the convex profiles of the glasslens to be formed, the two dies are then moved towards each other in a pressing stroke, the lens blank is moulded in the holder into a biconvex glasslens, an excess quantity of glass is pressed away during moulding and the lens element thus obtained comprising a glass lens and a holder is cooled.

Such a method is known from U.S. Pat. No. 4,398,935. By this method, biconvex lenses can be manufactured, which satisfy high requirements with regard to accuracy to shape and size without further aftertreatments. In this known method, weight variations of the lens blank can be neutralized in that the excess quantity of glass is pressed away through a radial gap between the dies and forms a radial flange on the moulded product after cooling. A biconvex lens with such a radial flange is known, for example, from U.S. Pat. No. 4,391,622. If the glass in the radial gap is cooled prematurely and solidifies, the solidified glass counteracts a build-up of pressure in the mass of glass due to the fact that the dies run against the solidified glass and a further pressurizing of the glass becomes impossible. The build-up of pressure is not optimal.

The processing temperature is that temperature at which the glass has such a viscosity that the glass moulding processes can be carried out in the desired manner. The optical glasses suitable for use are processed at a viscosity of $10^{2.5}$ to $10^{5.0}$ Pa.s ($10^{3.5}$–$10^{6.0}$ poises).

SUMMARY OF THE INVENTION

The invention has for its object to provide a method which does not suffer from these limitations and permits of increasing the accuracy to shape and size and the surface quality of the moulded products and of improving the reproducibility of the moulding process.

According to the invention, this object is mainly achieved in that a bipartite holder is used comprising two coaxial metal rings telescopically slidable with respect to each other and having different diameters, said rings enclosing an annular gap, in that the holder with the lens blank is arranged in the mould in a telescopically extended position of the rings, in that during the pressing stroke the two rings are telescoped into each other and in that the excess quantity of glass is pressed from the central part of the lens blank into the annular gap.

The holder is composed of an inner ring and an outer ring. During the moulding process, the glass is first entirely enclosed by the dies and the two rings. Upon further reduction of the volume, first the largest empty spaces are filled with glass. The glass is then pressurized. An excess quantity of glass is pressed from the hotter central part of the lens blank into the annular gap. The annular gap between the two rings can be determined so that with a given viscosity the associated pressure can be obtained. By means of the gap, a high pressure can be realized in the glass during the moulding process. If the volume is now still further reduced, glass will flow out of the gap under the influence of the pressure generated by the dies. The two rings act as a damper; due to the counterpressure, the two dies are braked so that time is gained to accomplish the moulding process. The two rings can be arranged in their extended position such that a smaller or larger quantity of glass is pressed away. The glass weight of the lens blank must be larger than the theoretical weight of the product to be moulded. Weight variations within the limits of $\leq 1\%$ are admissible.

The excess quantity of glass pressed away is collected in a hot zone of the annular gap in such a manner that the glass still can be moulded and will not solidify in the annular gap.

The holder consisting of two rings fulfils several functions. The holder serves for the build-up of pressure and for the manipulation of the glass. In the ultimate finished moulded product, the holder serves as a mount. Because of practical considerations, it is desirable that the optical axis of the glass lens coincides with the centre line of the holder.

A preferred embodiment of the method according to the invention is characterized in that a lens blank is used having two convex profiles, whose radii of curvature are smaller than the radii of curvature of the mould dies. Due to this step, the lens blank first comes into contact with the central part of the dies so that the mould cavity is filled radially from the inside to the outside, which favours a progressive and uniform shaping of the glass surface. Moreover, due to this step it is avoided that during moulding air is occluded in the mould.

For given products and/or with the use of given holders, there is a risk that a radial glass flange is formed between the dies with all the disadvantages already described. The formation of a flange is avoided in a further embodiment of the method according to the invention, which is characterized in that the volumes of the convex profiles of the lens blank are smaller than the volumes of the corresponding concave profiles of the dies. During the filling of the mould cavity from the inside to the outside, glass is thus prevented from being pressed between the holder and the die and from forming a solidifying flange.

The reproducibility of the moulding process and the accuracy to shape and size of the moulded products are positively influenced by preshaping the lens blank in such a manner that the blank approaches the shape of the final product as closely as possible. Such a lens blank is obtained in a further preferred embodiment of the method according to the invention in that the lens blank is preshaped in the holder by performing the following steps: a solid cylindrical glass preform is arranged in the telescopically extended holder, the holder with the glass preform is heated to the processing temperature of the glass, the holder with the glass preform is tilted several times through an angle of 180° about an axis at right angles to the centre line of the holder in such a manner that due to gravity and surface tension sagging of the glass occurs in the two directions axial with respect to the holder, a lens blank adhesively connected to the holder and having a biconvex profile being obtained.

Experiments have shown that in accordance with the invention lens blanks can be manufactured in a reproducible manner and in the desired form, that is to say a biconvex form approaching as closely as possible the convex form of the the ultimate glass lens, the radii of curvature of the roughly preformed glass product being smaller than the radii of curvature of the glass lens, however.

The method described of preshaping the lens blank issuitable to be used for larger numbers, for example batchwise. In practice, the preshaping process and the moulding process are carried out separately. This procedure has the advantage that the preshaped lens blanks can be controlled before the moulding process and that both processes can be carried out separately in an optimal manner. More particularly, for carrying out the moulding process with a cycle time of about 1 minute the preshaping process with a cycle time of about 5 minutes need not be taken into account.

The solid cylindrical glass preforms can be obtained in different ways, for example in that a glass rod having a desired diameter is subdivided accurately into equal portions by means of known techniques, for example by scratching and cleaving, by thermoshock combined with scratching, as the case may be in combination with wetting and the like. It must then be ensured that the rupture surfaces remain virginally clean. Any impurities can in fact be retraced in the end product. Again the rods can also be obtained in different ways, for example by boring of a rod from a glass block and subsequent grinding operation, by a drawing process and the like.

In order to avoid that after the moulding operation the shape of the glass surface still changes due to reheat, in other words due to the heating up of the solidified outer part by the still hot core, in another preferred embodiment the lens element is cooled after the pressing stroke in the closed mould to a temperature at which the glass lens is detached from the mould surfaces by shrinkage.

The shape of the die at the instant of detachment by shrinkage is determinative of the ultimate shape of the glass surface. This shape of the die again depends upon the temperature of and the time of contact with the glass.

In order to ensure that the excess quantity of glass in the annular gap is pressed away as uniformly as possible along the entire circumference of the holder, the two rings of the holder are positioned concentrically with respect to each other by means of spacers. Due to this measure, the annular gap between the two rings has the same thickness along the entire circumference. The spacers may be, for example, in the form of cams on the inner ring, but preferably on the outer ring, in such a manner that the frictional resistance is low and only a comparatively small pressure is required for telescoping the two rings so that in axial direction practically no forces are passed through.

In still another preferred embodiment of the method according to the invention, a holder is used, the two rings of which are made of an Ni alloy. It has been found that this material satisfies a combination of requirements imposed, i.e.: rigid in radial direction, that is to say sufficient resistant to deformation to be capable of withstanding a moulding pressure of 100-250 N; satisfactory adhesion to glass in order to obtain reliable connection of the glass with the holder serving later as a mount; an expansion coefficient which does not deviate too strongly from that of the glass to be processed in the temperature range in which stresses can be built up; heat resistant in view of the glass temperatures used of about 700° to 800° C. and the die temperatures of about 400° to 450° C. Preferably, the holder is further made of an anti-magnetic material.

Another material is used for the mould. Preferably, a mould is used of which at least the moulding surfaces are made of Cr steel. This material has a comparatively high hardness, a high elasticity module and a comparatively high heat conduction coefficient.

A lens element manufactured by the method according to the invention is characterized by a biconvex glass lens held in a metal mount consisting of two coaxial cylindrical rings telescopically slid into one another over part of their length. The two rings define an annular gap filled at least in part with glass. The optical axis of the lens element coincides with the centre line of the mount.

The method according to the invention has proved to be particularly suitable for manufacturing in a controlled and reproducible manner lens elements having a bi-aspherical glass lens.

BRIEF DESCRIPTION OF THE DRAWINGS

The invention will be described more fully with reference to the drawing. In the drawing:

FIGS. 5 and 6 show the step of moulding the lens blank in the holder into a lens element.

FIG. 7 shows on an enlarged scale in longitudinal sectional view a practical embodiment of a moulded lens element.

DETAILED DESCRIPTION OF THE PREFERRED EMBODIMENTS

Figure 1:
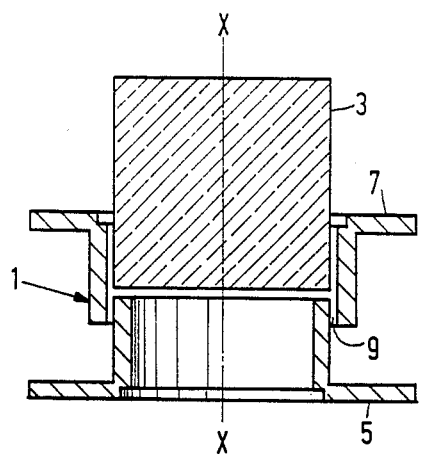
FIGS. 1 to 4 show diagrammatically the step of preshaping a lens blank in a holder.

In the present embodiment of the method of manufacturing a biconvex lens element, there is started from two elements, i.e. a holder 1 and a glass preform 3. The holder 1 shown on an enlarged scale in FIG. 7 is composed of an inner ring 5 and an outer ring 7. The two cylindrical rings have different diameters; the inner diameter D of the outer ring 7 is larger than the outer diameter d of the inner ring 5; the rings are telescopically slidable with respect to each other and define an annular gap 9. The two rings are positioned coaxially with respect to each other by means of cams 11 on one of the rings, these cams serving as spacers. Preferably, several cams 11 are provided on the outer ring 7 so as to be uniformly distributed over the circumference. The height or length of the holder 1 in the telescopcially extended positon of FIG. 1 is adjustable by means of a jig (not shown).

The glass preforms 3 are manufactured in a manner not shown further by cleavage of a glass rod. The rod is locally heated in a furnace. Subsequently, the rod is cooled down to ambient temperature. Thus, a tensile stress is generated in axial direction at the surface of the glass rod. At the same time, the glass surface is scored by means of a scratching wheel at a given area at which the stress is generated and moisture is supplied in the proximity of the score. Due to this score, the tensile strength of the glass considerably decreases, which results in a rupture being initiated at the area of the score. Due to the cooling and the moisture, the score progresses. The weight of the preform can be adjusted by the position of the rod with respect to the scratching wheel. This method of preform formation permits of obtaining very clean surfaces. This in contrast with many other methods, in which impurities due to the treatment can be retraced in the product. It will be appreciated that the glass preforms may also be manufactured in another suitable manner.

FIGS. 1 to 4 show diagrammatically at successive stages the manufacture of a lens blank 15. First a cylindrical glass preform 3 having a suitable diameter is arranged in the holder 1, the two rings 5 and 7 being in the telescopically extended position shown in FIG. 1.

Figure 2:
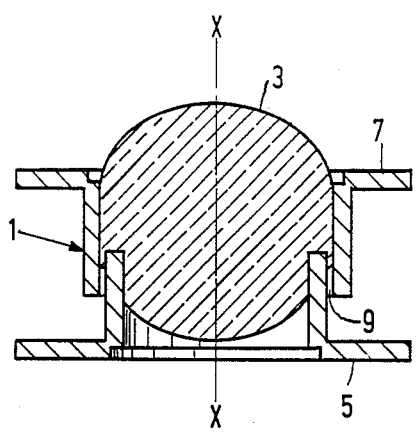
Figure 3:
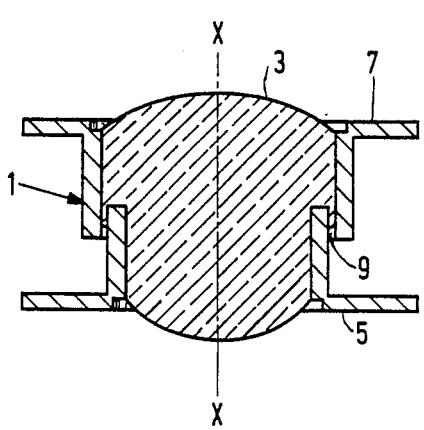
Figure 4:
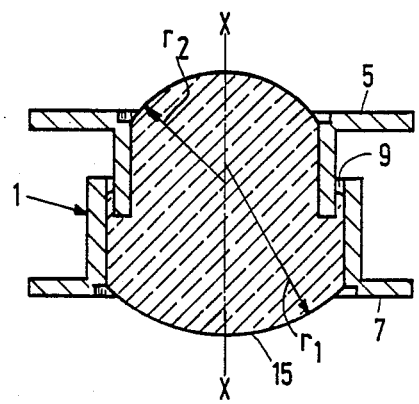

Subsequently, the holder 1 is heated up in a furnace together with the glass preform 3 so that the glass starts sagging. This situation is shown in FIG. 2. As soon as the glass has sagged through the holder 1, as shown in FIG. 3, the holder is tilted several times through an angle of about 180° about an axis at right angles to the centre line X—X of the holder. As a result, the glass sags in the two opposite axial directions, gravity and surface tension providing for the shaping of the glass. FIG. 4 shows the lens blank 15 preshaped in this manner in the holder 1.

The still hot lens blank now could be directly heated to the processing temperature and be subjected to the moulding process. However, according to the embodiment, the lens blank is cooled and is checked. The process described is suitable for a batchwise manufacture of the lens blanks. The shape obtained, i.e. the distribution of the glass over the surfaces, depends upon the tilting scheme and the weight of the glass preform.

For the manufacture of lens elements, the lens blank is heated up comparatively rapidly, i.e. in 30 to 90 s, homogeneously, for example in a high-frequency furnace, to a moulding temperature of in practice 700°–800° C. Due to this heating method, a satisfactory positioning of the lens blank with respect to the moulding dies can be obtained.

The desired profile of the glass lens is obtained by moulding the lens blank between dies having a lower temperature than the glass, in practice of 400°–500° C. Due to contact of the glass with the dies, the surface of the glass will solidify immediately. However, the required accuracy is obtained by filling the mould in the shortest possible time so that the shaping of the glass is effected more rapidly than the solidification. Moreover, due to the fact that the radii of curvature $r_1$ and $r_2$ of the lens blank (FIG. 4) are smaller than the radii of curvature $R_1$ and $R_2$ of the moulding dies 17 and 19 (FIG. 5), the moulding cavity is filled radially from the inside to the outside.

In order to obtain a satisfactory shaping of the glass, after the mould has been filled, pressure must be exerted on the glass for some time during the solidification of the surfaces. This is realized by means of the holder 1. Due to flow of the glass through the gap 9 under the influence of the moulding pressure, it is possible to build up in the glass an internal pressure, which will be determined by the pressure drop across the gap 9. The inner and outer rings 5 and 7, respectively, will telescope with respect to each other.

At this stage, the convex surfaces must be solidifed by heat transfer to the dies, while at the centre the glass must reamain sufficiently viscous to be pressed through the gap. The moulding time is the time duration of this stage, in practice about 1 second. FIG. 6 shows the moulded lens element 21 obtained in this way. The excess quantity of glass pressed away through the annular gap 9 forms a collar 25 on the lens element.

In order to prevent the shape of the convex surfaces from changing due to reheat, i.e. heating-up of the solidified outer side by the hot core, the product must still be cooled for some time, i.e. about 5 seconds, between the dies. In this processing step, the product must be detached from the dies by shrinkage. The shape of the die at the instant of detachment by shrinkage is determinative of the ultimate shape of the surface. This shape of die depends upon the temperature of and the time of contact with the glass during moulding. After the moulding product has thus been detached from the dies, it is removed from the mould and is cooled.

The moulded product must be cooled in such a manner that no stresses are introduced into the product and that the shrinkage is effected in a manner as controlled as possible. This means that the product must be cooled carefully in the temperature range in which stresses can build up, i.e. around the transformation temperature of the glass.

Besides, both the shrinkage and the stresses introduced into the glass will be influenced by a difference in expansion between the holder material and the glass material in the range: room temperature-stress build-up temperature. This difference must be as small as possible. Preferably, the product is cooled in a furnace in a controlled manner.

By means of the method according to the invention, lens elements were manufactured consisting of a biaspherical glass lens and a bipartite mount, the following materials and parameters having been used:

| | |
|---|---|
| Glass | LF 5 optical glass of Schott |
| Material holder | Ni alloy |
| Material moulding dies | Cr steel |
| Weight glass portion | 0.3 g |
| Diameter glass portion | 6 mm |
| Processing temperature glass | 725° C. |
| Thickness annular gap | 0.2 mm |
| Temperature moulding dies | 450° C. |
| Pressure force | 120 N |
| Moulding time | 1 s |
| Cooling time in mould | 5 s |
| Shaping time | 6 s |

What is claimed is:

1. A method of manufacturing biconvex lens elements having a biconvex lens and a two part holder, comprising the steps of:
   providing a two part holder of coaxial metal rings of differing diameters, said rings being slidable within one another and having an annular gap therebetween;
   providing a heat moldable lens blank having an overdimensioned volume of material;
   heating said holder and said lens blank to a temperature at which the material of the lens blank flows;
   positioning the holder and lens blank in the heated dies of a mold with the rings of the mold in an extended position;
   pressing the dies of said mold together to slide the two parts of the holder within one another and to press the excess material from the central part of the lens blank into the annular gap; and
   cooling the holders and the lens blank to form the completed lens element.

2. The method as claimed in claim 1, wherein the lens blank has two convex profiles, whose radii of curvature are smaller than the radii of curvature of the dies.

3. The method as claimed in claim 2, wherein the volumes of the convex profiles of the lens blank are smaller than the volumes of the corresponding concave profiles of the dies.

4. The method of claim 1, further comprising the steps of:

disposing a solid cylindrical lens blank within the telescopically extended ports of the holder;

heating the holder and the lens blank to a temperature at which the lens blank material flows;

inverting the holder and the heated lens blank portion about an axis at right angles to the center line of the holder such that due to gravity and surface tension the lens blank material sags into a convex shape at its upper and lower surfaces.

5. The method as claimed in claim 1, wherein the cooling step takes place in the closed mold to a temperature at which the material of the lens blank is detached by shrinkage from the molding surfaces.

6. The method as claimed in claim 1, wherein the two rings of the holder are positioned concentrically with respect to each other by means of spacers.

7. The method as claimed in claim 1, wherein the rings of the holder comprise a Ni alloy.

8. The method as claimed in claim 1, wherein at least one of the molding surfaces of the mold is made of Cr steel.

9. A biconvex lens element comprising first and second concentric radially spaced holder rings with a flowed lens element as produced by the method of claim 1.

* * * * *